United States Patent [19]

Wagner

[11] 3,845,721
[45] Nov. 5, 1974

[54] LINEAR MOTOR ASSEMBLY FOR DRIVING A VEHICLE OF A CONVEYING SYSTEM

[75] Inventor: Jakob Wagner, Weisendorf, Germany

[73] Assignee: Siemens Aktiengesellschaft, Munchen, Germany

[22] Filed: Sept. 25, 1972

[21] Appl. No.: 291,936

[30] Foreign Application Priority Data
Sept. 30, 1971 Germany............................ 2148824

[52] U.S. Cl. ...................................... 104/148 LM
[51] Int. Cl............................................ B60l 13/00
[58] Field of Search ............... 104/148 LM, 148 MS

[56] References Cited
UNITED STATES PATENTS

| | | | |
|---|---|---|---|
| 3,125,964 | 3/1964 | Silverman..................... | 104/148 MS |
| 3,548,751 | 12/1970 | Izhelya et al................ | 104/148 LM |
| 3,557,704 | 1/1971 | English ........................ | 104/148 LM |
| 3,589,302 | 6/1971 | Usami.......................... | 104/148 LM |
| 3,724,388 | 4/1973 | Karch........................... | 104/148 MS |

Primary Examiner—Robert S. Ward, Jr.
Assistant Examiner—Robert Saifer
Attorney, Agent, or Firm—Kenyon & Kenyon Reilly Carr & Chapin

[57] ABSTRACT

A linear motor assembly is disclosed for driving a vehicle of a conveying system along a guide structure that defines a travel axis. The linear motor assembly includes a motor truck, a winding carrier mounted on the motor truck, a rail-like return member arranged on the guide structure in operative proximity to the winding carrier, and a guidance arrangement for holding the motor truck separate from the vehicle. The guidance arrangement includes articulated joints for connecting the motor truck to the vehicle so as to render the motor truck movable in elevation independent of the vehicle and movable transverse to and about the travel axis.

2 Claims, 2 Drawing Figures

3,845,721

LINEAR MOTOR ASSEMBLY FOR DRIVING A VEHICLE OF A CONVEYING SYSTEM

BACKGROUND OF THE INVENTION

The invention relates to a linear motor assembly for driving a vehicle of a conveying system. More particularly, the invention relates to such a linear motor assembly wherein the motor truck is connected with the vehicle or its chassis by means of a guidance arrangement in a manner to permit movement of the truck in elevation independently of the vehicle.

In regard to arrangements wherein motor trucks are connected to the vehicle as indicated above, reference may be had to British Pat. No. 1,213,035.

The use of a linear motor has the advantage over drives which act on wheels via gears by means of alternating-current motors in that a vehicle can be accelerated and decelerated independently of the friction which is substantially reduced by moisture and dirt. In addition, the gearing becomes unnecessary. However, in vehicles with a linear motor, a very small, constant air gap of about 3 mm, for example, must be maintained between the winding carrier and the magnetic return member. With the known arrangement, a small air gap can be achieved only if the plane of the track encloses the same angle with the rail-like return member over the entire distance. This requires a large expenditure for the construction of the track and the installation of the rail-like return member.

SUMMARY OF THE INVENTION

It is an object of the invention to provide a linear motor assembly wherein the linear motor of the vehicle of a conveying system is guided in such a manner that a small, constant air-gap between the winding carrier and the return member of the linear motor can be maintained without the need for a precise installation.

The invention is especially applicable to conveying systems such as cranes, test sections and the like. The conveying system has a vehicle propelled by a linear motor assembly along a guide structure defining a travel axis.

The linear motor assembly of the invention includes a motor truck, a winding carrier mounted on the motor truck, and a rail-like return member arranged on the guide structure in operative proximity to the winding carrier. According to a special feature of the invention, a guidance arrangement holds the motor truck separate from the vehicle and includes articulation means for connecting the motor truck to the vehicle so as to render the motor truck movable in elevation independent of the vehicle and movable transverse to and about the travel axis.

The rail-like return member is associated with the winding carrier and is arranged on the road bed. The winding carrier of the linear motor is arranged in the motor truck and the motor truck is in turn held separate from the vehicle. The motor truck is connected by means of the above described guidance arrangement to the vehicle or its chassis.

Because of the foregoing features of the invention, the linear motor retains a constant, small spacing from the rail-like return member independently of differences in elevation between the rails of the track and deviations of the angular position of the track rails and of the rail-like return member which are caused by inaccurate installation of the track rails or by other causes such as flexing of the rails. The expenditure for accurate adjustment of the track rails and the rail-like return member is thereby eliminated. In vehicles with fixed axles, height guidance is not necessary if the track rails and the return member are combined in one structural unit. On the other hand, in vehicles with spring mounted axles or wheels having air filled tires or the like, relative motion such as swaying that occurs during travel is also compensated by the guidance afforded by the invention in the axial, transverse and elevational directions.

Although the invention is illustrated and described herein as a linear motor assembly for driving a vehicle of a conveying system, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
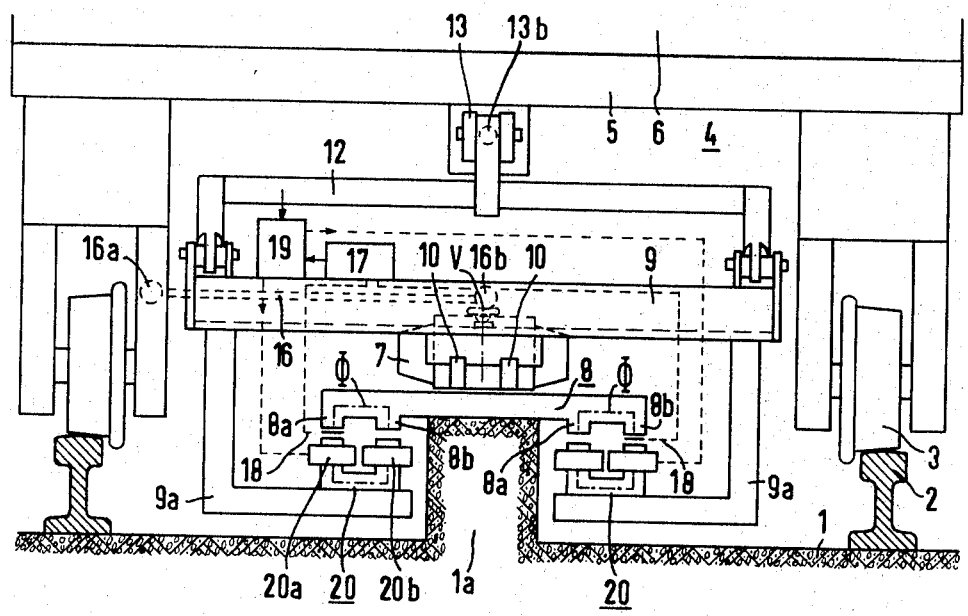
FIG. 1 is a view, partially in section, taken at a plane passing through the chassis of a vehicle equipped with a linear motor assembly according to the invention. This plane is perpendicular to the direction of travel of the vehicle.

Referring to FIG. 1, track rails 2 for the wheels 3 of a vehicle are anchored to a concrete roadbed 1. The vehicle has a chassis 5 and a car body 6. The vehicle 4 is driven by a linear motor operating according to the asynchronous-motor principle. The linear motor is comprised of a winding carrier 7 and a rail-like ferromagnetic return member 8. The return member 8 is mounted between the rails on a pedestal 1a of the concrete roadbed. In the conveying system according to the invention, the winding carrier 7 of the linear motor is arranged in a motor truck 9 which is separate from the vehicle 4. The motor truck 9 is connected with the chassis 5 by a guidance arrangement in such a manner that movement of the motor truck 9 can occur about the travel axis, transversely to the travel axis and in elevation; these movements being independent of the vehicle. The guidance arrangement comprises joints and a linkage 12, 13 which act as pull or push rods.

Figure 2:
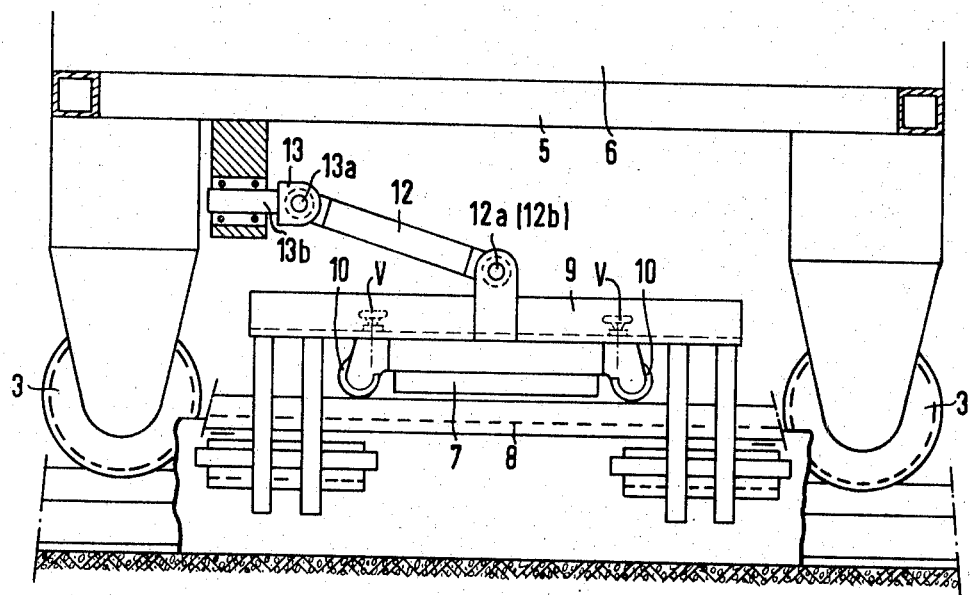
FIG. 2 is an elevation view, partially in section, taken at a plane passing through the vehicle portion of FIG. 1 in the longitudinal direction thereof.

According to the preferred embodiment of the invention, the motor truck 9 is linked to the chassis 5 of the vehicle 4 by the guidance arrangement which includes a fork 12 and articulation means comprising universal joints 13a, 13b. The guidance arrangement provides guidance in the direction of travel. On the other end, the rigid fork 12 is connected with the motor truck 9 by means of the two joints 12a, 12b situated horizontally transversely to the travel axis (FIG. 2). Thereby, with simple components, the condition is achieved where the winding carrier 7 is freely movable relative to the vehicle, and so, it is not necessary to fit the track rails 2 and the rail-like return member exactly to each other with respect to their elevation position. In this manner the installation of the return member 8 and the track rails 2 is greatly facilitated.

The winding carrier 7 of the linear motor is articulately connected with the chassis 5 and is preferably guided by a magnetic suspension guide. To guide the carrier 7, magnetic suspension means comprising direct-current magnets with a U-shaped core 20 is provided. The magnets are arranged at the support members 9a of the motor truck 9. These direct-current magnets are associated with return member means in the form of ferromagnetic return structures on the roadbed which likewise have a U-shape. The return structures for the suspension guide can be formed by the legs 8a, 8b arranged on the underside of the magnetic return member 8. The return structures are disposed in operative proximity to respective ones of the direct-current magnets and conjointly define respective air-gaps therewith. The direct-current magnets have coils 20a, 20b which are supplied by the on-board power system. This power system may be operated, for example, by a generator which is arranged on the vehicle and is driven by a prime mover.

It is advisable to regulate the excitation current in the coils 20a, 20b by control means comprising a regulating control device 17 in such a way that a predetermined distance is always maintained between the legs of the magnetic cores 20 and the legs 8a, 8b of the magnetic return structures. To achieve this condition, the truck 9 is equipped with direct-current magnet means comprising at least four direct-current magnets, each of which is provided with a sensor 18, for example, a resistance element dependent on a magnetic field, particularly a galvanomagnetic device such as a Hall generator. The sensor can be considered as part of the control means and transmits a signal to control the spacing to the regulator 17, the signal being a function of the distance between the direct-current magnet and the return member. The regulator in turn acts on an adjusting member 19 in the power supply leads to the coils 20a20b in the direction of maintaining a predetermined constant air gap.

The magnetic flux $\phi$ in the direct-current magnets runs transversely to the travel axis. In order to keep the eddy currents small, it is advisable to make the pole faces of the magnet core 20 and of the return body narrow areas elongated in the direction of motion, as described, for example, in U.S. Pat. No. 3,741,613.

With the configuration of the direct-current magnets and the return members as shown, not only can the truck 9 with the winding support 7 of the linear motor be float supported, but at the same time, a stabilizing effect against lateral displacement is achieved.

Using another guide arrangement for maintaining the distance of the winding carrier 7 relative to the ferromagnetic return member 8, the motor truck 9 can advantageously be linked at the front and rear by ancillary linkage means comprising a linkage 16 coacting with a ball joint 16a on the chassis 5 and a ball joint 16b on the motor truck 9 (shown by broken lines).

According to another embodiment of the invention, roller means in the form of rollers 10 are arranged at the motor truck 9 which are adjustable in height and which can be put into use, for example, if the air-gap between the winding carrier 7 and the return member 8 falls below a predetermined value. The rollers can then roll on the return member 8. The rollers 10 are also suited for maintaining a constant air-gap of the linear motor in lieu of a magnetic suspension support for vehicles with slow speed, such as for cranes and the like.

The invention makes it possible in a simple manner to use linear motors with a small air-gap even in conveying systems in which the vehicle itself is guided by a suspension support because only the motor truck, which has a small mass and includes the winding carrier, has to be guided at an accurate spacing from the return member of the linear motor.

What is claimed is:

1. In a conveying system having a vehicle with a chassis propelled by a linear motor assembly along a guide structure defining a travel axis, the linear motor assembly comprising a motor truck, a winding carrier mounted on said motor truck, a rail-like return member arranged on the guide structure in operative proximity to said winding carrier, and a guidance arrangement for connecting said motor truck to the vehicle chassis, said guidance arrangement including:

force transition means comprising a fork connected to said motor truck for holding the same so as to be disposed in a direction corresponding to the travel axis, for transmitting pulling and pushing forces from said motor truck to the vehicle, a plurality of movable joints for connecting said force transmission means between said motor truck and the vehicle so as to cause said motor truck to be movable in elevation independent of the vehicle, and articulated joint means comprising a rotatable joint, one of said movable joints and said rotatable joint cojointly defining an articulated joint for connecting said fork to the chassis of the vehicle, and for causing said motor truck to be also movable about and transverse to the travel axis independent of the vehicle, and ancillary linkage means for connecting said motor truck to the chassis of the vehicle in the direction transverse to the travel axis.

2. The linear motor assembly of claim 1, said ancillary linkage means comprising a linkage member, and respective universal joints connecting said linkage member to the chassis of the vehicle and to said motor truck.

* * * * *